Patented Apr. 18, 1950

2,504,803

UNITED STATES PATENT OFFICE 2,504,803

INSECTICIDAL COMPOSITIONS CONTAINING PRIMARY POLYHALOPHENYLETHYLAMINE

Charles C. Clark, Kenmore, N. Y., assignor to Mathieson Chemical Corporation, New York, N. Y., a corporation of Virginia No Drawing. Application September 14, 1948, Serial No. 49,304

4 Claims. (Cl. 260—510.9)

The present invention relates to insecticides and more particularly to improved insecticides consisting essentially of one or more members of the herein defined class of nuclear halogenated phenylethylamines as an active ingredient.

Many organic compounds have been found to be useful constituents of insecticide mixtures. However, it has usually been necessary to combine a plurality of such compounds in order to produce a wholly effective insecticide combining the property of immediately incapacitating the insects with that of finally killing them.

It has been found that certain organic materials have the characteristic of temporarily incapacitating insects, flies for instance, this characteristic being conventionally known as "knock-down" action. Other materials have been found to kill the flies, but only after a considerable period following exposure. In order to combine in a single insecticide the characteristic of immediate knock-down with the capacity to kill it has, as previously noted, been necessary to use a plurality of chemical compounds in the insecticide mixture.

The necessity of using separate knock-down and killing agents has been a decided disadvantage economically. The situation has been further aggravated by the fact that only a few compounds having immediate knock-down capacity are known, the principal one being pyrethrum extract, the supply of which is uncertain and fluctuating and largely depends upon foreign sources.

I have discovered that the polyhalophenylethylamines have the uncommon characteristics of combining effective knock-down and killing actions to an extraordinary extent and that wholly effective insecticides may be prepared from these amines alone or using these amines as the sole active ingredients in insecticide mixtures.

The polyhalophenylethylamines of my present invention are not to be confused with compounds in which the aromatic nucleus is directly attached to the nitrogen atom. To the contrary, in the amines of my present invention the NH$_2$ group is directly attached to a carbon of the ethyl group and the polyhalogenated aromatic nucleus is likewise attached to a carbon of the ethyl group, either with the carbon to which the NH$_2$ group is attached or to the other carbon atom.

The structure of the amines of my present invention is illustrated by the following structural formulae for alpha- and beta-polychlorophenylethylamines respectively:

and

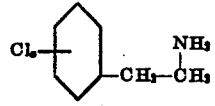

where $x$ represents an integer not less than 2 nor greater than 5.

I have used with particular advantage the polychlorophenylethylamines, especially the dichlorophenylethylamines and the trichlorophenylethylamines. However, other polychloroethylamines and also corresponding compounds in which the nuclear halogen is other than chlorine may be used with advantage. Further in addition to the halogen atoms and the ethylamine group, other groups, for example, the methyl group, may be directly attached to the aromatic nucleus.

Because of the dual function of these amines, as previously noted, they may be effectively used alone as insecticides or may be used in dilution with conventional diluents, for instance, highly refined kerosene, as a spray. It has been found that a sufficient amount of the amines to effect a knock-down will also be sufficient eventually to produce a kill, and accordingly the necessary concentration of the amines to produce a kill is readily determinable, since that required to produce a knock-down is immediately apparent.

A highly satisfactory and effective insecticide may be produced in accordance with my present invention by dissolving a minor proportion, say about 5%, of one of these amines or a mixture of the amines, in an inert diluent such as kerosene. These amines may be so used alone or in conjunction with other active insecticides with which they are compatible.

There amines have been found to be soluble in and particularly compatible with the chlorinated tertiary butyl aromatic compounds described in the co-pending application of Joseph F. Weiler, Serial No. 645,703, filed February 5, 1946. The chlorinated tertiary butyl aromatic compounds having the chlorine predominately in the side chain may be prepared by direct chlorination with chlorine, in the presence of light, of the corresponding tertiary butyl aromatic compound at a reaction temperature of about 50° C. to about 150° C. A side chain chlorination catalyst such as phosphorus trichloride may be used if desired. Chlorination of the nucleus of the tertiary butyl aromatic compound can be effected with elemental chlorine in the presence of nuclear chlorination catalysts such as ferric chloride or antimony chloride. These procedures are applicable to the production of chlorinated tertiary butyl aromatic compounds by chlorination of a monocyclic aromatic compound such as tertiary butyl benzene, of a polycyclic aromatic compound such as tertiary butyl diphenyl ether or tertiary butyl naphthalene, and of a compound containing a plurality of tertiary butyl radicals such as ditertiary butyl benzene. Such chlorotertiary butyl aromatic compounds are powerful killing agents and have been found to supplement the killing action of the amines previously described herein. A mixture of the amines with chlorinated tertiary butyl aromatic compounds, particularly the chlorinated tertiary butyl benzene may be effectively used as such or dissolved in kerosene or other inert diluent.

Where desired my improved insecticide may contain odorants such as linalool, geraniol, phenylethyl alcohol and tetradecanol or the like. Also solubilizers, such as isopropanol, xylene or the like, as well as other active and inactive ingredients may be included.

The polyhalophenylethylamines described herein may be prepared by reacting alcoholic ammonia with a chloroethyl polyhalobenzene or with a mixture of position isomers of the chloroethyl polyhalobenzene. The alcoholic ammonia may be prepared readily by passing dry ammonia gas into the alcohol until a solution is obtained containing for example from 10 to 20% ammonia by weight, although the ammonia content of the solution is not critical. The ammonia may be dissolved in any alcohol in which the solubility of ammonia is appreciable such as methanol or ethanol. Preferably, the alcohol should be anhydrous as this promotes mutual solubility of the ammonia and the chlorine compound in the alcohol. It is advantageous to use an amount of the alcoholic such as to provide an excess of ammonia over the amount theoretically required to form the desired amine from the chloroethyl polyhalobenzene. Thus, the amount of ammonia added to the chloroethyl polyhalobenzene in the form of alcoholic ammonia may range between 1.1 and 3, and preferably about 1.5, times the stoichiometric amount required, lesser amounts leading to incomplete reaction and larger amounts serving no useful purpose. The temperature of reaction may vary from 100° to 250° C. At low temperatures within this range the reaction is slow and at relatively high temperatures within this range there is a tendency toward the production of a lower yield of the desired acid-soluble amine and a higher yield of an acid-insoluble reaction product. Particularly effective reaction temperatures range between 125° and 170° C. The pressure maintained during the reaction may range from about 100 to about 300 pounds per square inch, with a pressure of about 150 pounds per square inch being preferred. The reaction is generally completed within a period of 5 to 7 hours, shorter periods leading to incomplete reaction and longer periods tending to lower the yield of the desired amine.

My present invention and the effectiveness of my improved insecticide will be illustrated by the following specific examples:

Example I

Ethylbenzene was subjected to nuclear chlorination in a conventional manner to produce ethyldichlorobenzene, and a mixture of the position isomers thereof so produced were recovered by fractionation. The mixture of position isomers of ethyldichlorobenzene was then chlorinated by conventional means to produce a mixture of alpha and beta isomers of chloroethyldichlorobenzenes. The resulting product, comprising alpha and beta isomers of chloroethyldichlorobenzenes, was then reacted with ammonia by charging to an autoclave 500 parts by volume of said product and 2000 parts by volume of an anhydrous solution of ammonia in methanol containing 0.0761 gram of ammonia per ml. of solution. The autoclave was closed and was heated for a period of 6⅔ hours during which the temperature ranged between 92° and 118° C. and the pressure ranged between 140 and 162 pounds per square inch. At the end of the reaction period, the reaction product was removed from the autoclave, the liner of the autoclave was washed twice with a small amount of methanol, and these washings were combined with the reaction product. The combined reaction product and washings were filtered, and ammonia and alcohol were removed from the filtrate by distillation. The ammonia- and alcohol-free product was then poured into water and was made acidic by the addition of concentrated hydrochloric acid. An insoluble oil separated from the acidic aqueous phase and was discarded. The acidic aqueous phase was made alkaline by adding caustic soda thereto and was allowed to settle. The oily layer which then settled from the alkaline aqueous phase was separated, dried by passing dry nitrogen therethrough, and was distilled. A fraction comprising a mixture of alpha and beta dichlorophenylethylamines and amounting to 105.4 parts by weight was recovered, this product having a boiling range of 81–85° C. at 5 mm. Hg pressure absolute and having a refractive index of 1.5595. A solution of 5% by weight of the resultant dichlorophenylethylamine in a refined kerosene was atomized into a glass chamber containing about 30 flies. A complete knock-down was achieved in about 6½ minutes. As a test of the killing power of the insecticide, about 15 flies (*Musca domestica*) were placed in a toximeter consisting of a spherical screen cage adapted to be rotated slowly during introduction of the insecticidal solution. The above identified solution was sprayed into the cage and at the end of 24 hours about 65% of the flies had been killed.

Example II

Ethylbenzene was subjected to nuclear chlorination to produce a mixture of position isomers of ethyltrichlorobenzene which were recovered by fractionation and were then chlorinated to produce a mixture of alpha and beta chloroethyltrichlorobenzenes. The resulting product, recovered by fractionation, had a density of 1.438 at 25° C., contained 14.22% of side chlorine and 56.86% total chlorine. An autoclave was charged with 154 parts by volume of this product and 616 parts by volume of an anhydrous solution of ammonia in methanol containing such an amount of ammonia that 10 ml. of the solution required the addition of 109.2 ml. of 0.5144 normal hydrochloric acid to neutralize it. The autoclave was closed and was heated for a period of 7½ hours during which the temperature was maintained at 133–164° C. and the pressure ranged between 125 and 250 pounds per square inch. The contents of the autoclave were then removed and had added to them the washings obtained by rinsing the liner of the autoclave with 50 parts by volume of methanol. Ammonia and methanol were removed from the mixture by evaporation. The residue was added to a mixture of 1000 parts by volume of water and 35 parts by volume of concentrated hydrochloric acid, and the resulting mixture was boiled for one hour. Insoluble material was separated and the acidic aqueous solution was filtered. The filtrate was made alkaline by the addition of 50 parts by volume of a 50% sodium hydroxide solution and the resulting oily layer was separated therefrom. The oil was dried by passing dry nitrogen therethrough. On distillation a fraction was obtained consisting of a mixture of alpha and beta trichlorophenylethylamines having a boiling range of 85–100° C. at 2 mm. Hg pressure absolute and having an index of refraction of 1.5788. A 5% solution of the resultant amine in refined kerosene was sprayed into the toximeter described in the preceding example. The knock-down was complete in 8 minutes and after 24 hours the results showed a total kill of about 63%.

*Example III*

A nickel autoclave was charged with 154 parts by volume of alpha-chloroethyldichlorobenzenes and 616 parts by volume of an anhydrous 10% solution of ammonia in methanol. The autoclave was closed and was then heated for 7⅓ hours at a temperature of 130–175° C. with the pressure in the autoclave varying between about 150 to about 300 pounds per square inch. After cooling and emptying of the autoclave, its contents were heated to distill off the methanol and excess ammonia. The residual oily product was poured into water and concentrated hydrochloric acid was added until the aqueous phase remained strongly acidic. The mixture was then heated and agitated for one hour by passing steam directly thereinto. At the end of this period, the mixture was allowed to settle, and the aqueous phase was removed and made alkaline by the addition of a 50% aqueous solution of sodium hydroxide. After again allowing the mixture to settle, the oily amine layer was separated from the aqueous phase and was dried. The resulting product comprised a 44.3% yield of alpha dichlorophenylethylamine having the following identifying characteristics: $N_D^{25}=1.5521$; chlorine content=34.47%; and nitrogen content=6.62%.

A mixture of 2.5% of dichlorophenylethylamine produced as described in Example I and 2.5% of a chlorinated tertiary butyl benzene in refined kerosene showed the following results in a toximeter test such as described in Example I; females killed 44.3%; males killed 88.5%; weighted average 66.5%. The same composition tested in a glass chamber described in Example I showed a knock-down of 73% in ten minutes. The chlorinated tertiary butyl benzene used was a mixture of chlorination products containing 2 to 3 side chain chlorine atoms and 2 nuclear chlorine atoms per molecule and was obtained as follows: A mixture of 2816 parts by weight of tertiary butyl benzene containing dissolved therein 5 parts by weight of antimony trichloride was chlorinated in the dark at 35° C. by the passage of chlorine gas therethrough until an increase in weight of 1947 parts by weight was observed. The product was washed with water and dried. On distillation in vacuum a fraction was obtained the first portion of which boiled at 128-9° C. at 25 mm. and the latter portion of which boiled at 109–113° C. at 10 mm. The refractive index of portions of this material ranged from 1.5340 to 1.5318, and comprised a mixture of isomers of tertiary butyl dichlorobenzene containing nuclear chlorine.

A charge of 2103 parts of the above tertiary butyl dichlorobenzene was then chlorinated in the presence of light at 80–90° C. until the increase in weight indicated the replacement of 2.4 hydrogen atoms. On fractional distillation three fractions of fairly constant index and boiling point were obtained, the third of which boiled at 148–155° C. at 2.5 mm. pressure and had a refractive index of 1.5790–97. This sample, as indicated hereinbefore, contained 2 nuclear chlorine atoms, and side chain chlorine analysis indicated that it consisted of 30% of material having 2 side chain chlorine atoms combined with 70% of material containing 3 side chain chlorine atoms.

A highly effective insecticide was prepared by mixing 20% of an alpha dichlorophenylethylamine produced as described in Example III with 80% of trichlorotertiary butyl-dichlorobenzene. This solution may be effectively used as an insecticide as such or may be diluted with 3 to 4 volumes of kerosene or other inert solvent and used as a spray.

Where used in a diluent, as a spray for instance, the concentration of the amine is subject to wide variation, depending primarily upon its intended use. A concentration of about 5% by weight will be found sufficient for most purposes although a concentration of 20% by weight or more may be used with advantage. Generally, a concentration of less than about 1% is not recommended unless some other effective killing agent is also included.

In addition to solvent diluents for my amines, I may also use other diluents including solids, preferably powdered, or liquids which serve as emulsifying media. Thus suitable proportions of my amines either undiluted or admixed with solvents including kerosene and the chlorotertiary butyl aromatics may be adsorbed or admixed with powdered solids for example, bentonite, pumice or talcum. It is feasible to spray the undiluted amines or their solutions in active or inert solvent diluents onto such powders while agitating the latter until, say, 5% of the mixture is active ingredient. Alternatively the undiluted amines or their solutions may be emulsified into a medium such as water preferably with the help of emulsifying agents and the like. By the use of the term "inert diluent" in the appended claims I mean to include all the above diluent means, and particularly the solvent, solid and emulsion types of diluents.

This application is a continuation in part of my co-pending application Serial No. 686,719, filed July 27, 1946, which is now abandoned.

I claim:

1. An insecticidal composition characterized by both knock-down and killing power and containing, as an active insecticidal component, primary polyhalophenylethylamine in which the amino group and the polyhalophenyl group are attached to the ethyl group.

2. An insecticidal composition characterized by both knock-down and killing power and containing, as an active insecticidal component, primary polychlorophenylethylamine in which the amino group and the polychlorophenyl group are attached to the ethyl group.

3. An insecticidal composition characterized by both knock-down and killing power and containing, as an active insecticidal component, primary dichlorophenylethylamine in which the amino group and the dichlorophenyl group are attached to the ethyl group.

4. An insecticidal composition characterized by both knock-down and killing power and containing, as an active insecticidal component, primary trichlorophenylethylamine in which the amino group and the trichlorophenyl group are attached to the ethyl group.

CHARLES C. CLARK.

REFERENCES CITED

The following references are of record in the file of this patent:

UNITED STATES PATENTS

| Number | Name | Date |
| --- | --- | --- |
| 2,441,518 | Suter et al. | May 11, 1948 |
| 2,443,206 | Suter | June 15, 1948 |